Patented Nov. 16, 1943

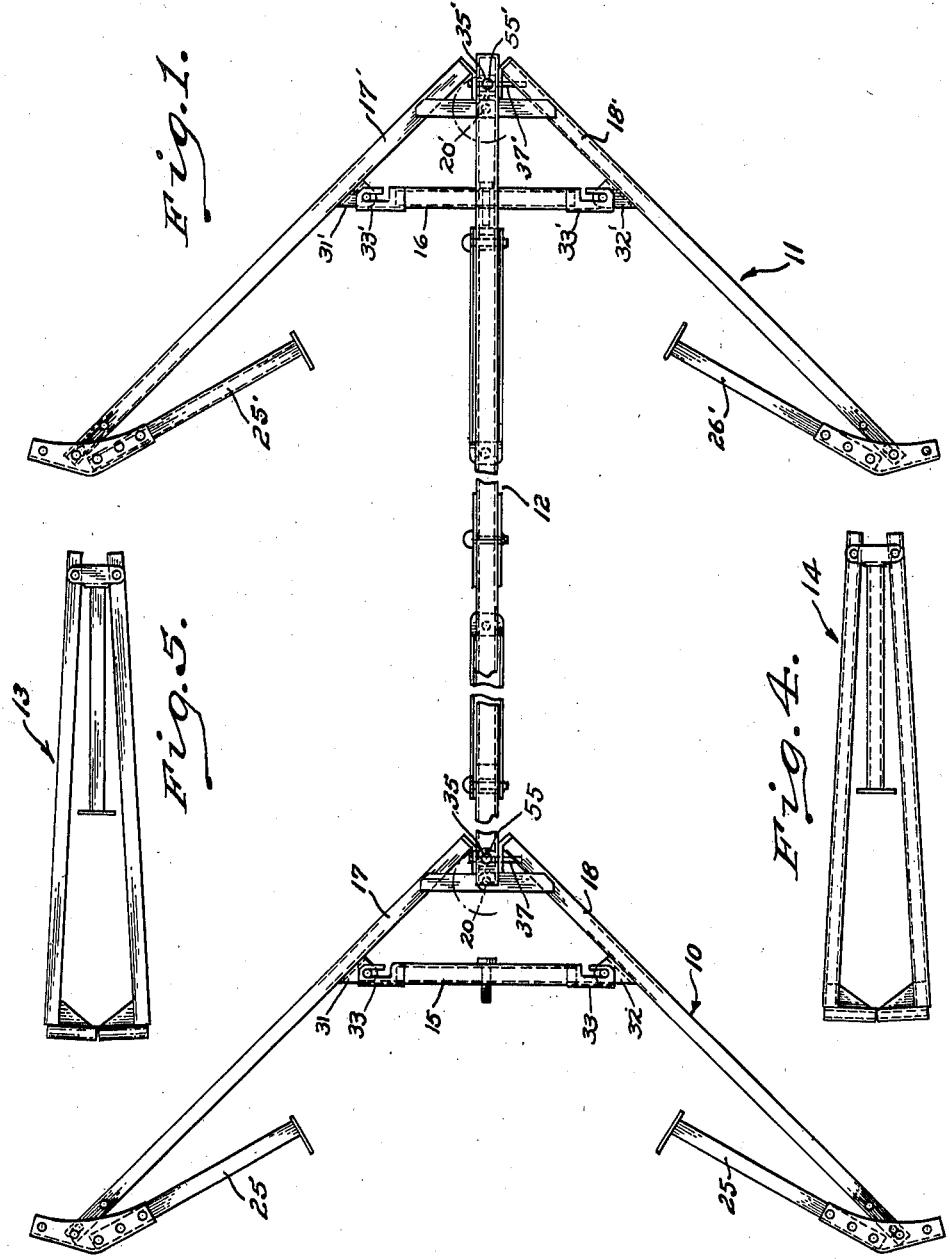

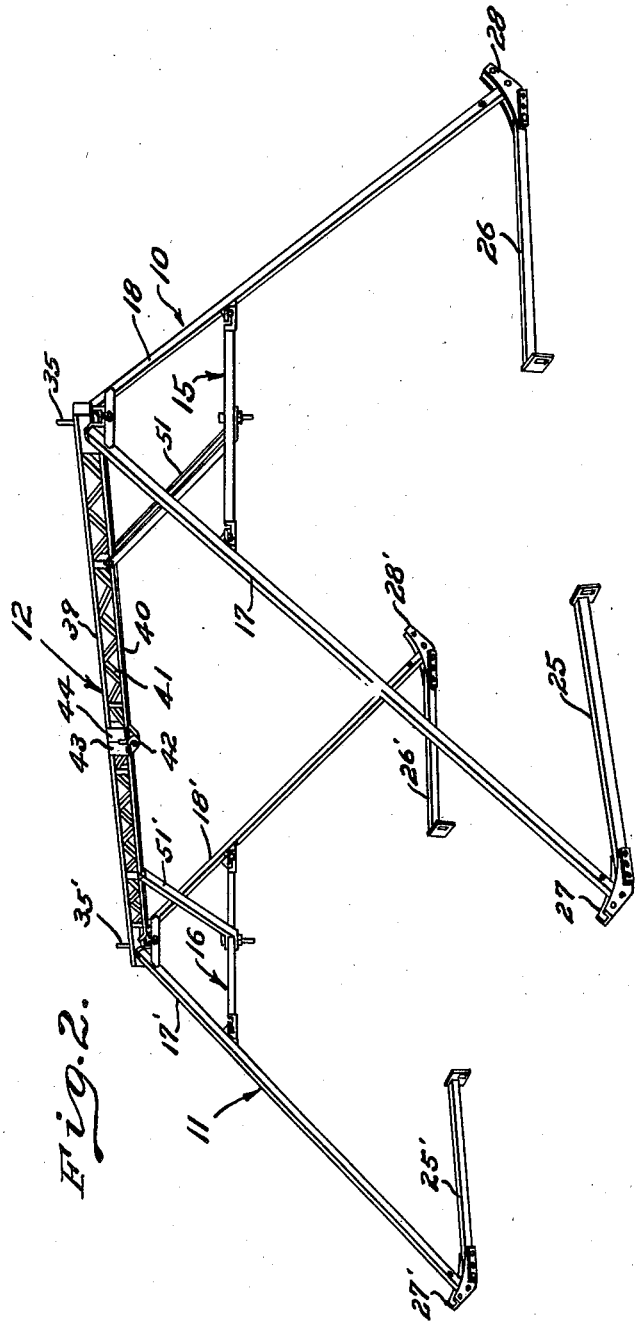

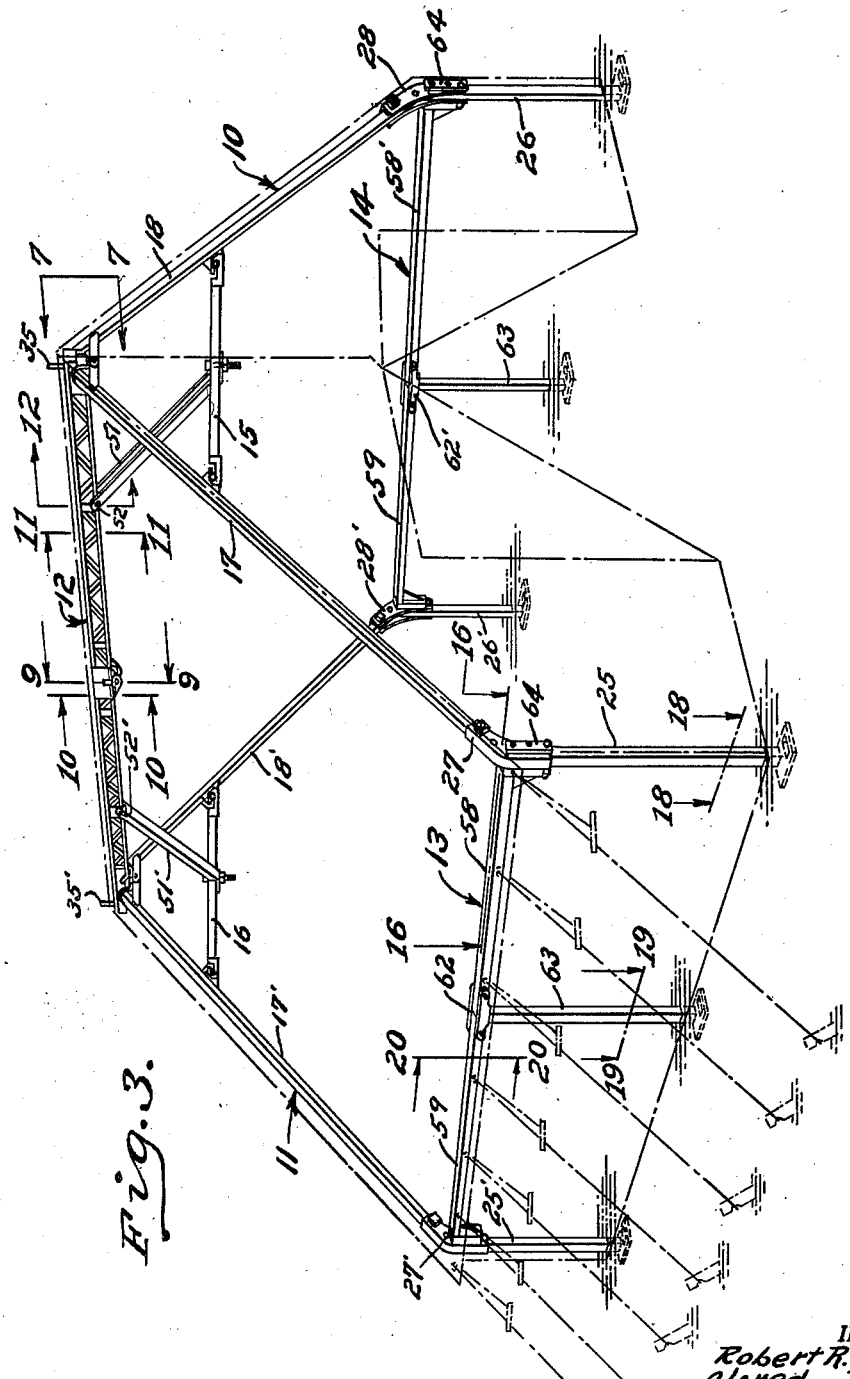

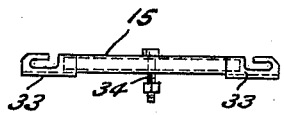
Fig. 6.
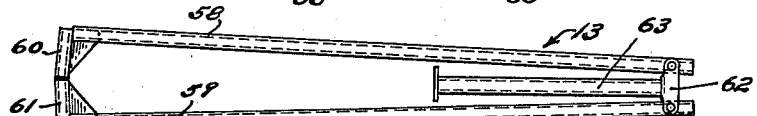
Fig. 6.A.
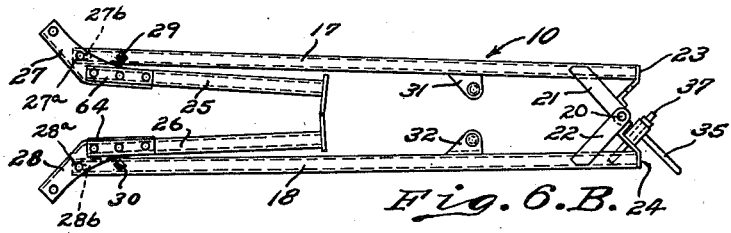
Fig. 6.B.
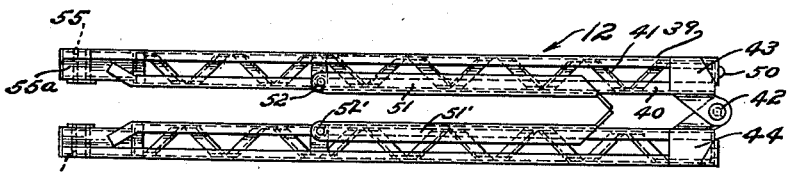
Fig. 6.C.
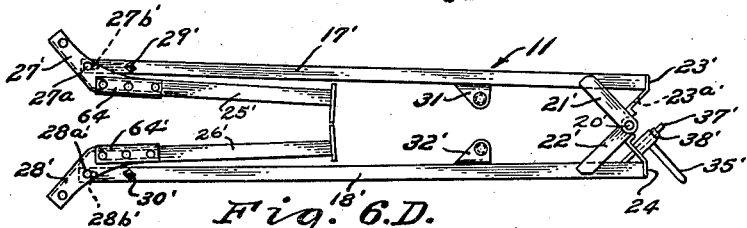
Fig. 6.D.
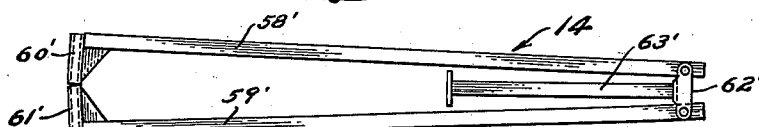
Fig. 6.E.
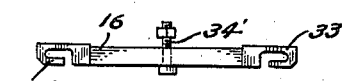
Fig. 6.F.

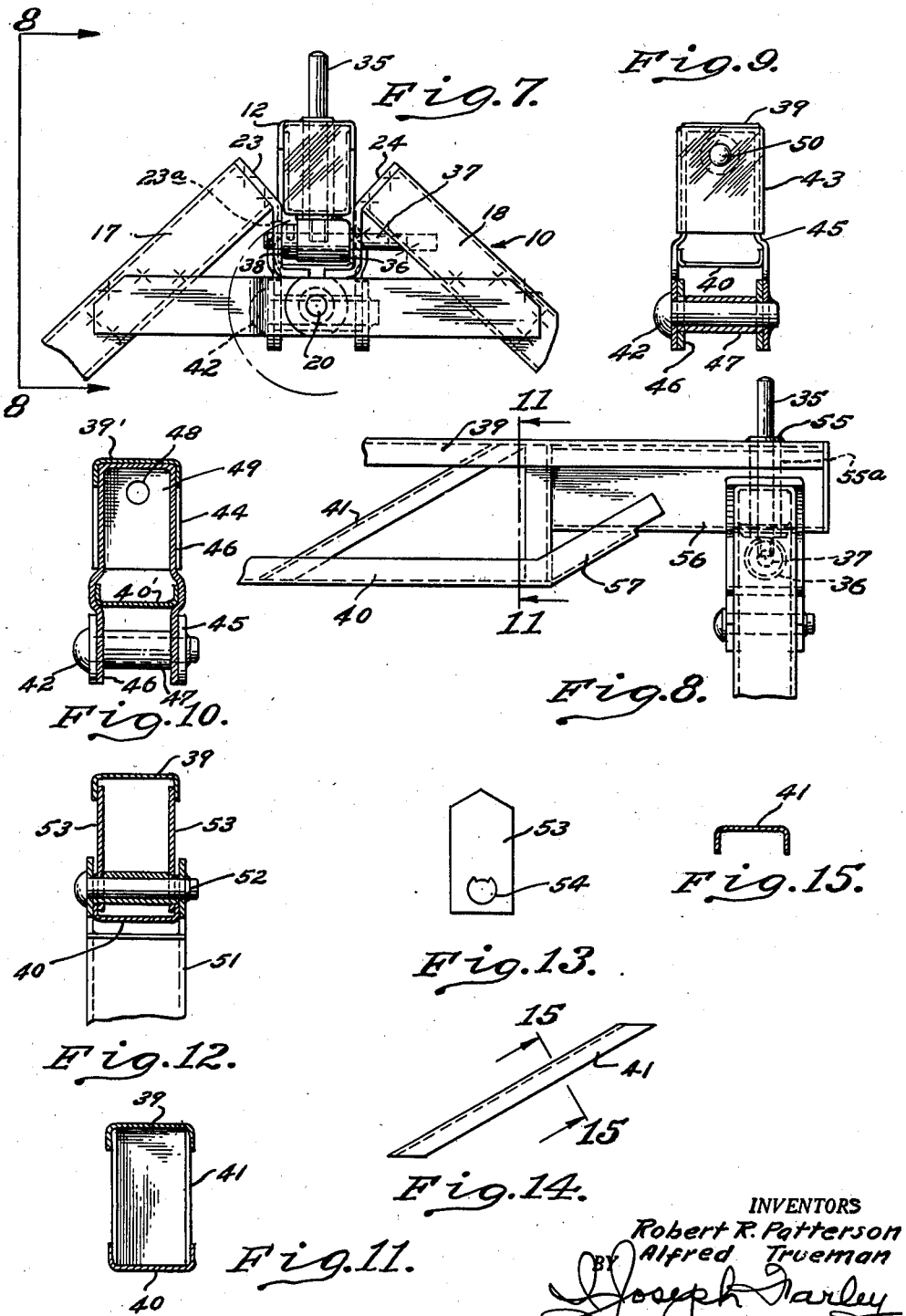

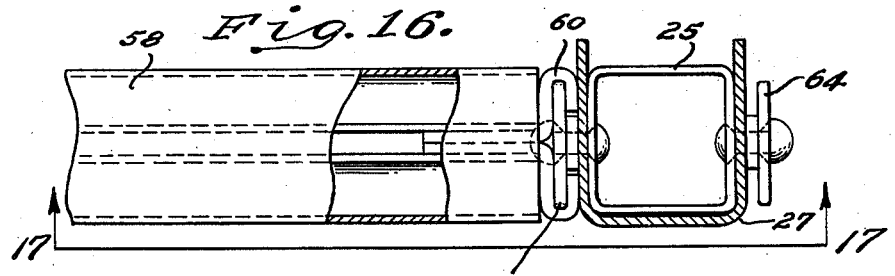
Fig. 16.
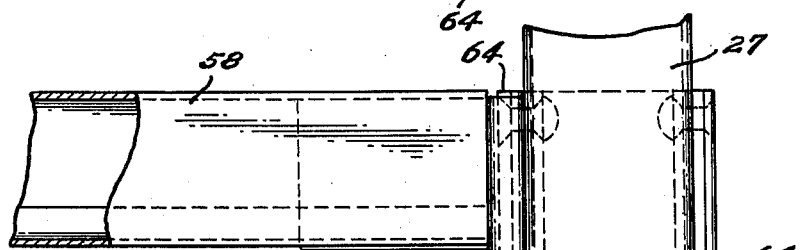
Fig. 17.
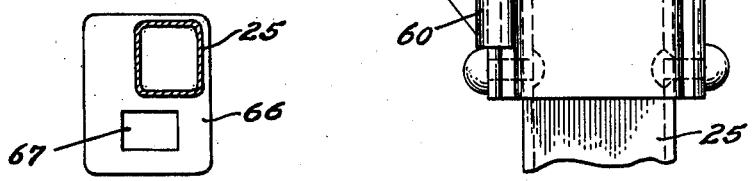
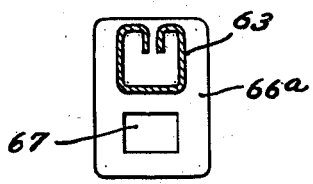
Fig. 18.
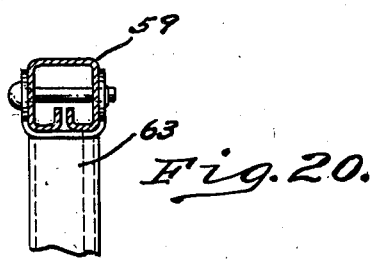
Fig. 20.
Fig. 19.

2,334,435

UNITED STATES PATENT OFFICE 2,334,435

FOLDING FRAME STRUCTURE

Robert R. Patterson, Grosse Pointe, and Alfred Trueman, Detroit, Mich., assignors to Mechanical Handling Systems, Inc., Detroit, Mich., a corporation of Michigan Application April 13, 1942, Serial No. 438,714

9 Claims. (Cl. 135—3)

This invention relates to Folding frame structures particularly designed for use as a supporting structure for a portable shelter such as a tent.

In structures of this class, it is highly desirable that the frame be capable of being easily and quickly assembled and disassembled and when disassembled it should be in a compact form which can be satisfactorily packed for transport. It is also important that the frame be of rigid construction when assembled to afford a satisfactory structure.

It is, therefore, the primary object of the present invention to provide a folding frame of the above type which will satisfy the requirements of, facility in assembly, compact packing when disassembled, and rigidity of frame when assembled.

It is a further object to make available a tent frame, the major parts of which can be preliminarily assembled together in a substantially flat position on the ground, and the frame parts then raised together into their final relative positions.

It is another object to make available a tent frame having A-frame end wall to ridge pole connections, so arranged that the ridge pole may be assembled to the A-frame end walls when said A-frames are in flat position on the ground and with said ridge pole so connected to said A-frames as to allow simultaneous swinging movement of said A-frames to a vertical position facing each other while carrying said ridge pole into final position relative to the A-frames.

The above and other objects of the invention will appear more fully from the following more detailed description, and by reference to the accompanying drawings forming a part hereof and wherein:

Fig. 1 is a plan view of the ridge pole and A-frame end wall units of the tent frame assembled together in position ready to be raised.

Fig. 2 shows the assembly of Fig. 1 raised to the position wherein the upper parts of the A-frame are in a vertical position, and the diagonal braces from the ridge pole to the A-frame are in place.

Fig. 3 shows the frame completely assembled with a diagrammatic showing thereon of the canvas covering and supports therefor.

Fig. 4 is a plan view of a side wall frame in a folded position.

Fig. 5 shows the folded position of the other side wall frame for the opposite side of the tent from that shown in Fig. 4.

Figs. 6 to 6—F inclusive are plan views of all the various sub-assemblies which are used for the complete assembly, the parts being shown in their folded positions, as follows:

Fig. 6 shows the A-frame cross brace.

Fig. 6—A is one side wall frame.

Fig. 6—B is one A-frame end wall.

Fig. 6—C is the ridge pole together with the ridge pole to A-frame braces secured thereto.

Fig. 6—D is the other A-frame end wall which is identical with the one shown in Fig. 6—B.

Fig. 6—E is the other side wall frame which is identical with the one shown in Fig. 6—A.

Fig. 6—F is the other A-frame cross brace identical with the one shown in Fig. 6.

Fig. 7 is a detail of the ridge pole to A-frame connection, front view, with the A-frame open.

Fig. 8 is a view taken on the line 8—8 of Fig. 7 and shows a side view of the ridge pole to A-frame connection.

Fig. 9 is a section through the ridge pole center hinge joint and is a section taken substantially on the line 9—9 of Fig. 3.

Fig. 10 is a section through the ridge pole adjacent the center hinge joint and is a section taken substantially on the line 10—10 of Fig. 3.

Fig. 11 is a section taken through the ridge pole adjacent the diagonal brace connection and is a section taken on the line 11—11 of Fig. 3.

Fig. 12 is a section through the ridge pole at the point where the ridge pole diagonal brace connects and the section is taken on the line 12—12 of Fig. 3.

Fig. 13 is a plan view of the gusset which forms a vertical member in the girder and which secures the ridge pole to the diagonal brace.

Fig. 14 is a detail of one ridge pole lattice brace member.

Fig. 15 is a further detail of one ridge pole lattice brace member and shows a cross section taken on the line 15—15 of Fig. 14.

Fig. 16 is a top view partially in section of the A-frame to side wall frame joint and is taken on the line 16—16 of Fig. 3.

Fig. 17 is a side view of the A-frame to side wall frame joint and is taken on the line 17—17 of Fig. 16.

Fig. 18 is top view of the end plate used at the bottom of each of the A-frame vertical members and is a view and section taken on the line 18—18 of Fig. 3.

Fig. 19 is a top view of the end plate used at the bottom of each of the side wall vertical frame center members and is taken on the line 19—19 of Fig. 3.

Fig. 20 is a section through a horizontal side frame member near the vertical center member and is a section taken on the line 20—20 of Fig. 3.

Referring to the drawings, the tent frame herein disclosed is made in seven compact subassembly units, each of which when disassembled, and ready for packing, is a compact unit of a size easily packed with the other units. These seven units are shown in Figs. 6 to 6—F, inclusive, all of the parts which are capable of folding, being shown in their folded positions. The parts are as follows: A-frame or end wall assemblies 10 and 11, shown in Figs. 6—B and 6—D; ridge pole assembly 12 shown in Fig. 6—C; side frame assemblies 13 and 14 shown in Figs. 6—A and 6—E; and A-frame cross braces 15 and 16 shown in Figs 6 and 6—F.

A-frame end wall assemblies with cross braces

Each of the A-frame end walls 10 and 11 have diagonal or rafter members 17, 18, the corresponding members in the A-frame 11 being numbered 17' and 18'. The two diagonal members 17 and 18 of the A-frame are pivotally connected together at the top or apex by pivot pin 20 connected by suitable hinge connecting members 21, 22 and 23, 24. The lower vertical members of the A-frame 25, 26 are secured to the members 17, 18 by U-shaped angle fittings 27, 28, these fittings being formed to make the correct angle to hold the members 25, 26 vertical when the A-frame diagonal rafter members 17, 18 are in final position. The lower ends of the U-shaped angle fittings 27, 28 are respectively secured to the members 25, 26 by a plurality of securing rivets while the upper ends of the fittings 27, 28 are secured to the members 17, 18, respectively, each by a single rivet 27a, 28a forming a pivot so that the ends 25, 26 may be swung into the folded position shown in Figs. 6—A and 6—B. The holes 27b, 28b in the members 17, 18 where the pivots are formed are slotted so that the ends of members 17, 18 and 25, 26 may be brought close together in final position and also be free to swing to folded position without interference. In final position, the fittings 27, 28 are each secured by additional securing members which are herein shown as bolts 29, 30.

The A-frame diagonals 17, 18 also carry two lugs 31, 32 with suitable pins or rivets therein, as shown, to receive A-frame cross braces 15, 16 shown in Figs. 6 and 6—F. These A-frame cross braces 15, 16 each have a slotted fitting 33 at their ends which fit on the pins of the lugs 31, 32 and slide outward thereon to be locked in place and to retain the A-frame from further outward movement. Each of the A-frame cross braces 15, 16 have a permanently secured bolt 34 projecting downwardly therefrom to receive the ridge pole diagonal brace later to be described.

Each A-frame also carries at its upper end a ridge pole pin 35 which is shown on the detail views of Figs. 7 and 8 as well as in Figs. 6—B and 6—D. The ridge pole pin 35, as shown in Fig. 7, is mounted upon a cylindrical shaped block 36 having an axially extending hole therein to receive a pivot pin 37, the ridge pole pin 35 being threaded into the cylindrical block 36 in a direction perpendicular to the central opening for the pin 37. The pin 37 has a laterally extending right hand portion, as shown in Fig. 7, which is secured, preferably by welding, to the A-frame hinge connecting member 24, and diagonal 18 as shown in Fig. 7. The block member 36 is secured on the pin 37 but left free to rotate relative thereto by means of a collar 38, also as shown in Fig. 7.

The left hand end of the pin 37 extends a short distance beyond the adjacent hinge connecting member 23 and the hole 23a cut in said hinge connecting member 23 is of oblong shape so that on the opening of the A-frame the projecting end of the pin 37 will, on swinging on the arc shown, extend into the opening and will be supported on the lower side only of the oblong hole in hinge connecting member 23. The result of the aforementioned mounting of the ridge pole pin 35 is to pivot its lower end on an axis in the plane of the A-frame and substantially horizontal and parallel to the ground when the A-frame is in opened position ready for use. Such a mounting allows the pin to swing in a vertical plane perpendicular to the plane of the A-frame during assembly as will later appear.

Ridge pole

Ridge pole 12 is made up of top and bottom longitudinal members 39 and 40, respectively, with lattice type diagonally disposed connecting members 41, such a construction producing a member which is generally termed in the structural art as a lattice type girder (see Figs. 2, 6c and 8). The ridge pole 12 is hinged at its center on a pin 42, thus making it possible to fold the ridge pole into the compact form shown in Fig. 6c. The hinge point is offset downwardly from the bottom longitudinal member 40 of the ridge pole by suitable fittings 43, 44, having portions shaped to be welded or otherwise secured to the members 39 and 40 as shown in Fig. 6c. Further details of the hinge joint are shown in Figs. 9 and 10. Referring to Fig. 9, which is a cross sectional detail of the fitting 43, it is there shown that the downwardly projecting hinge member is formed in a U-shape 45 which fits inside of the longitudinal channel member 39 and is bent to surround the lower longitudinal member 40 and has its downwardly extending portions formed to receive the pivot pin 42. Similarly, the fitting 44 is made up of a U-shaped member 46 also fitting inside the channel member 39' and bent to surround the lower channel member 40' and the downwardly extending portions fit inside the similar portions of the U-shaped member 45 to form the hinge, the pivot pin 42 extending through both lower extending extremities of members 45 and 46. A short tube 47 serves as a spacer to prevent collapsing of the free lower ends of members 45, 46 as shown in both Figs. 9 and 10. The alignment of the two parts of the hinged ridge pole is further assured by the provision of a hole 48 in the end of a plate 49 covering the end of the fitting 44 and a projection 50 in the similarly located hole in the plate covering the end of the fitting 43 (Fig. 6—C). The several parts above described are preferably secured to the ridge pole longitudinal members by welding, although other securing means may be used.

Diagonal brace members 51, 51' are secured to the under side of the ridge pole and are pivotally mounted thereon by pin connections 52 and 52'. This construction is shown in Figs. 3, 6—C and 12, Fig. 12 being a cross section through the pin connection. The pin connection is secured to the ridge pole by vertical members 53, shown in Fig. 12 and Fig. 13, with a notched hole 54 so shaped as to retain the pin 52 from rotation relative to the member 53 and thus requiring that the pin 52 rotate in the holes provided in the projecting end of the member 51.

The ends of the ridge pole are provided with vertically disposed holes 55, 55' adapted to fit on the ridge pole pins 35, 35' and are formed by suitable pieces of tubing 55a welded to the inside of the longitudinal member 39 and similarly secured to a U-shaped member 56 extending below the member 39 and further secured to the ridge pole by the diagonal member 57 secured to the end of the longitudinal member 40 (Fig. 8).

*Side frame assemblies*

The side frame assemblies 13, 14, shown folded in Figs. 6—A and 6—E, comprise longitudinal members 58, 59, each having a joint member 60, 61 secured at their ends. (The two assemblies 13, 14 are identical, the parts being numbered 58', 59', etc. in the side frame 14.) At the opposite end, each of the members 58, 59 is pivoted to a fitting 62 which has a downwardly extending vertical member 63 secured thereto, the member 62 and the downwardly extending member 63 forming a T-shape. The members 58, 59 fold as shown at the pivots formed at the ends of the fitting 62. The joint members 60, 61 are formed in a flattened C-shaped section, as shown in Fig. 16, thus forming a slotted fitting which slides over a suitable oblong plate members 64 secured to vertical members 25, 26 of the A-frame by rivets and spacers as shown in Fig. 16, three rivets being used, two with flat heads and the lower rivet with an extending head serving as a stop for the member 60 as shown in Fig. 17. The oblong plates 64 are secured to both sides of the A-frame vertical members 25, 26, 25', 26' in order that the A-frames may be used for either end of the tent. Figure 20 shows a further detail of the connection between the fitting 62, the vertical member 63 and the horizontal members 58, 59 of the side frame assembly, Figure 20 being a section through the horizontal member of the side frame looking toward the center folding joint made by fitting 62.

End plates 66 are secured to the bottom of the vertical members of the A-frame as shown in Figure 18, a hole 67 being provided for a stake to more positively secure the frame to the ground if so desired. Similar end plates are also secured to the end of the side frame vertical members as shown at 66A in Fig. 19 and in Fig. 3, a similar hole 67A for a stake being also provided.

*Assembly*

One of the important features of the frame is its ease of assembly. Beginning with the parts in folded position as they would be when unpacked, Figs. 6 to 6—F inclusive, showing the parts in their folded condition, the first step in assembly is to take the two A-frames, 10 and 11 and open them up to the positions shown in Fig. 1 by swinging the two members 17, 18 on the hinge joint 20, the two frames 10, 11 being laid down on the ground with their top ends pointing in the same direction in substantially the condition shown in Fig. 1. Before the A-frames are entirely opened to the position shown in Fig. 1, the A-frame cross members 15 and 16 (Figs. 6 and 6—F) are hooked to the lugs 31, 32 and when the A-frames are opened their position is determined by the end of the slot in the end fittings 33 of the A-frame cross members 15, 16 as shown in Fig. 1.

With reference to the ridge pole pins 35, 35', Figs. 6—C and 6—D show the position of these pins when the A-frames are in folded position, the pivot pin 37 being secured to the members 18 and 24. As the A-frame swings on hinge 20, however, the pivot pin 37 is carried by the member 18 and finally the end of pin 37 swings into the final position, shown in Fig. 7 with end of pin 37 at the bottom of the slotted hole 23a in member 23. The ridge pole pins 35 will then be free to pivot on the cross pins 37, see Figs. 1 and 7, so that the pins 35 can be brought to an upright position perpendicular to the plane of the A-frames as shown in Fig. 1. At this stage in the procedure, the ridge pole 12 shown folded in Fig. 6—C can then be unfolded to its extended length position and placed in position adjacent the end frames so that the upwardly extending ridge pole pins 35, 35' of the A-frames can readily be entered into the holes 55, 55' in the ends of the ridge pole. The entire assembly is then in substantially the condition shown in Fig. 1 with the A-frame and ridge pole assembly being flat on the ground. The next step is to lift the A-frames to a vertical position, and during this movement the A-frames swing relatively to the ridge pole on the pivot pins 37 which are horizontal and in the plane of the A-frames. After this swinging movement to bring the A-frames vertical, the frame is then in the position shown in Fig. 2. In order to secure the assembly in this position, it is only necessary to unfold the diagonal brace members 51, 51' and secure their ends to the A-frame cross braces 15 and 16 by means of the bolts 34, 34' and the wing nuts attached thereto. It will be apparent that the assembly, as shown in Fig. 2 with members 51, 51' in place, is in a rigidly supported position and will stand by itself. The next step in the assembly is to lift the frame sufficiently so that each of the vertical members 25, 26, 25', 26' of the A-frames may be unfolded and brought to a vertical position. The U-shaped fitting members 27, 28, 27', 28' then coming into position on the diagonal rafter members 17, 18 of the A-frames and being secured in place by the previously mentioned bolts and nuts 29 and 30, this position of the A-frames being shown in Fig. 3. It will be remembered that the holes 27b, 28b are slotted and therefore when the vertical members 25, 26 are in final position the pins or rivets 27a, 28a forming the pivot will be pushed to the upper ends of their respective slots, thus bringing the members closer together than would be possible without the slotted construction.

It is next necessary to assemble the side frame units 13, 14. These side frames are shown in Figs. 6—A and 6—E and are also in folded condition in Figures 4 and 5 on the same sheet as Fig. 1. It will be apparent on inspection of Figs. 1, 3, 4 and 5 that it is only necessary to unfold the side frame units 13, 14 and to connect their end fittings to the A-frames by sliding them downwardly on the previously described plates 64 (Figs. 16 and 17) a center vertical member 63 extending downwardly to the ground as shown in Fig. 3. When a side frame assembly for both sides of the tent is assembled as above mentioned, the frame will be in the condition shown in Fig. 3. It is intended that the canvas will be placed over the frame when it is first assembled on the ground as shown in Fig. 1 and it is obvious that the canvas will be raised at the same time as the frame and when completed the canvas will be in place ready to be staked down as shown diagrammatically in Fig. 3.

As shown in the various sectional views such as Figs. 9, 10, 11, 16, 18, 19 and 20, the frame herein illustrated is preferably made up of square steel tubing or structural channels for the frame supporting members while channel members are used for the top and bottom longitudinals of the ridge pole, all of the structural members being preferably constructed of standard structural shapes. With such a construction it is possible to make the frame of relatively light construction, the rectangular and square shaped form of the parts also lends itself to formation of joints necessary for making the several sub-assemblies into satisfactory folding units. It is also important that the entire unit is made up into a relatively small number of sub-assembly units each complete and permanently assembled, the seven units being shown in Figs. 6 to 6—F inclusive, as previously noted. These folded units can be piled into a compact form and the entire bundle securely fastened in a single package. It is also important that the entire assembly of a tent employing this frame structure may be easily assembled with the minimum amount of time, two men can easily complete the assembly.

Although a tent frame structure designed for a specific purpose has been described herein, it is the intention that various modifications may be made when designing frames suitable for other purposes while making use of the fundamental principles herein disclosed.

We claim:

1. A structure of the class described comprising, A-frames forming ends for supporting said structure, ridge pole pins pivoted on a horizontal axis parallel with the plane of said A-frames, a ridge pole connecting said A-frames and supported on said ridge pole pins.

2. A structure of the class described comprising, a pair of A-frames forming ends of said structure, diagonal rafter members on each of said A-frames, a hinge joint connecting said diagonal members and forming a portion of the A-frame, a detachable A-frame cross brace connecting said diagonal members below said hinge, a ridge pole pin pivotally mounted on each of said A-frames on a horizontal axis in the plane of said A-frame above said hinge and on an axis at right angles to the pivotal axis of said hinge connection, a ridge pole adapted to be mounted on said ridge pole pins whereby said A-frames and said ridge pole may be assembled by laying said A-frames in a horizontal position, then placing said ridge pole on said ridge pole pins and next raising said A-frames to a vertical position.

3. A tent frame comprising, A-frames forming ends, a ridge pole pin on each of said frames having its lower end pivoted near the apex of the A-frame on a horizontal axis in the plane of said A-frame, whereby said A-frames and said ridge pole may be preliminarily assembled by placing said A-frames in a horizontal position with their apexes pointed in the same direction and placing said ridge pole on said ridge pole pins and subsequently raised into position by swinging said A-frames to a vertical position.

4. In a tent frame, a folding A-frame comprising diagonal rafter members, a pin forming a hinge at the apex of said A-frame and connecting said diagonal members adjacent the ends thereof, a ridge pole pin, and a pivotal connection for said ridge pole pin mounted above said hinge connection and having its axis at right angles thereto.

5. In a tent frame, A-frames forming ends of said frame, diagonal members forming the apex of each of said A-frames, a hinge joint connecting said diagonal members adjacent the apex of each of said A-frames, a ridge pole pin, a pivotal mounting for said ridge pole pin having an axis parallel with the plane of said A-frame, and supporting means for said pivotal mounting carried by one of said diagonal members at one side of said hinge connection.

6. In a frame of the character described, end frames, a ridge pole, ridge pole pins mounted adjacent the apex of said end frames, and a pivotal mounting for said ridge pole pins having a horizontal axis parallel with the plane of said end frames.

7. In a frame of the character described; a ridge pole of the lattice girder type comprising a pair of sectional portions, and a hinge connecting said sectional portions; end frames supporting said ridge pole; a pivotal connection between each end of said ridge pole and each of said end frames having its axis horizontal and parallel to the plane of said end frames; and a diagonal brace member connecting each of said end frames with said ridge pole.

8. In a frame of the character described, end frames, a ridge pole, a pivotal connection adjacent the top of each of said end frames for connecting the end portions of said ridge pole to said end frames, said pivotal connections positioned to allow swinging of said end frames relative to said ridge pole on a substantially horizontal axis of said pivotal connections.

9. In a tent frame, A-frame end walls comprising, a pair of diagonal members forming upper portions of said A-frames having a slotted hole opening near each lower end, vertical members forming lower portions of said A-frames, a pivot pin in each of said slotted hole openings effecting a pivotal connection between said vertical and diagonal members and allowing relative sliding movement between said vertical members and said diagonal members thereby to place said vertical members closely adjacent the ends of said diagonal members when in final position and to allow said vertical members to move away from said diagonal members when folding said vertical members relative to said diagonal members.

ROBERT R. PATTERSON.
ALFRED TRUEMAN.